A. H. CROZIER.
Car-Starters.

No. 144,260. Patented Nov. 4, 1873.

Witnesses:
A. W. Almqvist
C. Sedgwick

Inventor:
A. H. Crozier
Per Munn & Co
Attorneys.

UNITED STATES PATENT OFFICE.

ARCHIBALD H. CROZIER, OF NEW YORK, N. Y.

IMPROVEMENT IN CAR-STARTERS.

Specification forming part of Letters Patent No. 144,260, dated November 4, 1873; application filed September 6, 1873.

*To all whom it may concern:*

Be it known that I, ARCHIBALD H. CROZIER, of the city, county, and State of New York, have invented a new and useful Improvement in Combined Car Brake and Starter, of which the following is a specification:

The invention will first be fully described and then pointed out in the claim.

Figure 1:
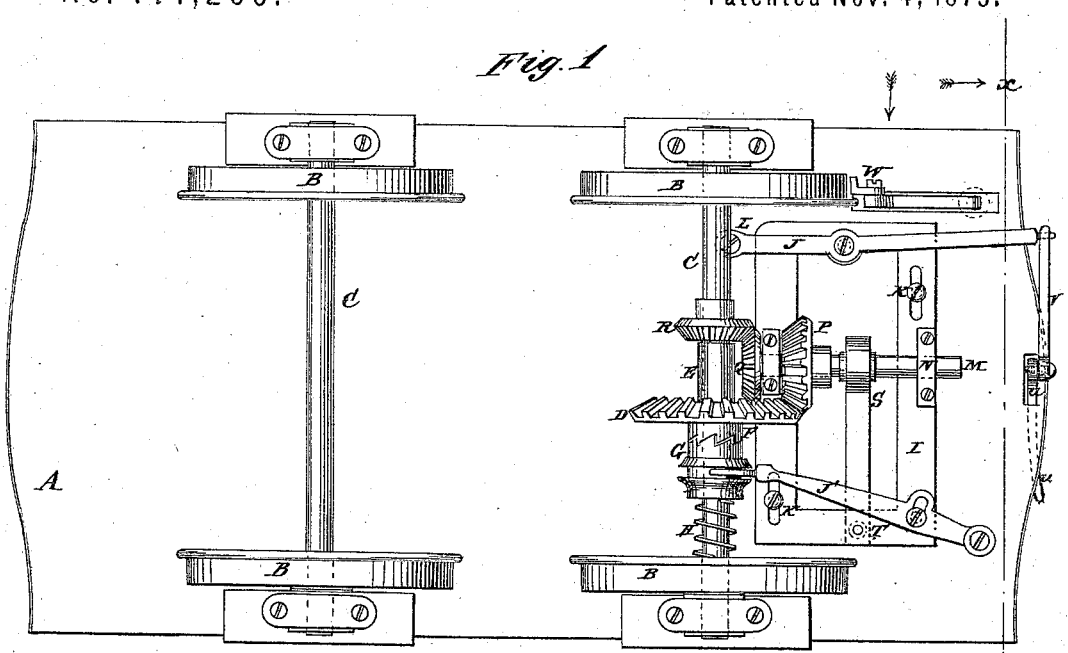
Figure 2:
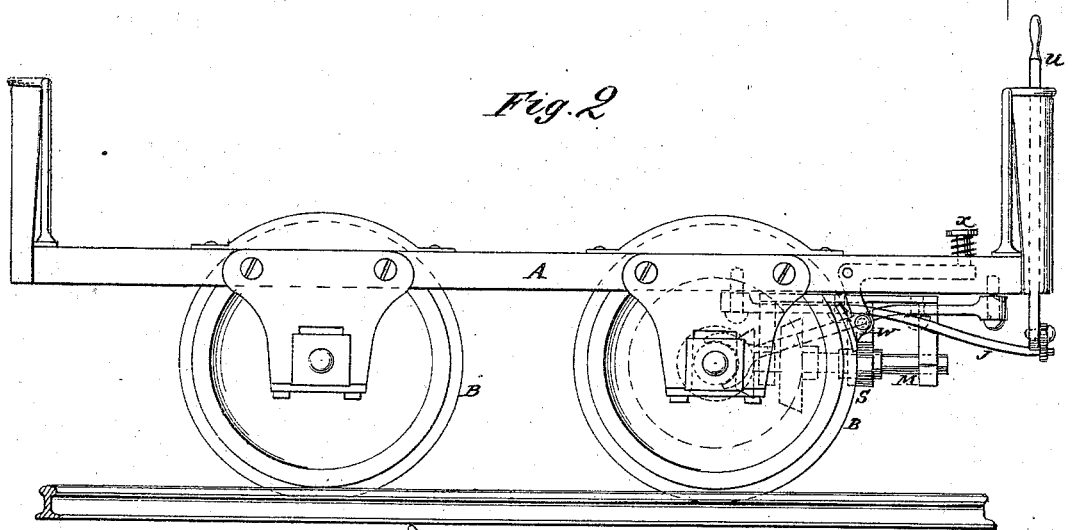
Figure 3:
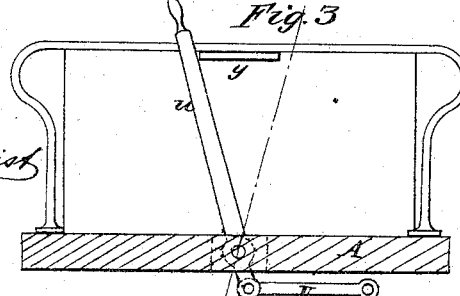

In the accompanying drawing, Figure 1 is a plan view of the mechanism, showing the car reversed or bottom side up. Fig. 2 is a side view of the car when in running position. Fig. 3 is a vertical cross-section of Fig. 1 taken on the line $x$ $x$, looking in the direction indicated by the arrow.

Similar letters of reference indicate corresponding parts.

A represents the car; B, the wheels; C, the axles. D is a bevel-wheel attached to the sleeve E, and revolves freely on the axle. On the back of this wheel is a clutch, F. G is a clutch-coupling, which slides on a feather on the axle, and engages with the clutch F, and acts upon the axle when the spring is uncoiling. H is a spiral spring on the axle, which bears against the coupling, and forces it to engage with the clutch of the wheel. In winding up the spring the teeth of the coupling-clutch slip past each other without affecting the axle, but when the coil-spring reacts they engage, and the power is conveyed to the axle. I is a frame, which is given a sliding motion beneath the bottom of the car by means of the lever J. This frame is confined to the bottom of the car by means of screw-heads and slot-holes K, and operating the coupling-lever J'. The fulcrum of the lever J is at L. M is a shaft attached to this frame by journal-boxes N O. P is a bevel-wheel on this shaft M, which meshes with the clutch-wheel D. Q is a bevel-wheel on the end of this shaft, which meshes with the wheel R. This wheel R is fast on the car-axle. S is the coil-spring, which is wound up around the shaft M in stopping or braking up the car. One end of the spring is attached to the shaft, and the other end to the frame I, as seen at T.

The wheels Q and R are thrown in and out of gear by the sliding motion given to the frame I by means of the lever J and the upright operating lever $u$, which latter is connected with the lever J by the bar or rod V. (See Fig. 3.)

In braking or stopping the car, the two miter-wheels Q R are thrown into gear, which winds or coils up the spring and stops the car. Should the momentum of the car be greater than required for winding up the spring, the brake W may be applied to the wheel by the driver pressing with his foot upon the spring-stud X on the platform of the car.

When it is desired to start the car, the driver moves the lever $u$ to the other end of stop-plate Y, (see Fig. 3,) which throws the wheels Q R out of gear. The wheel D, being engaged with the coupling and axle, receives the reactive force of the coil-spring through the wheel P, and transmits it to the axle, thus starting the car. The spring S will ordinarily have strength and length sufficient to cause the car to stop by a single revolution of the axle, the spring having its full power in reserve to produce a reverse motion when released.

The bevel-wheel D is twice the diameter of the wheel P, which allows the spring double the leverage in starting the car that was exerted in stopping it.

Between the stopping-places, during the time of running, all the braking and starting mechanism is inactive, except that the coupling G and miter-wheel R are carried with the axle.

Having thus described my invention, I claim as new and desire to secure by Letters Patent—

The combination, with the axle of a car-truck, of the levers J J' $u$, frame I, gear-wheels P Q R D, and clutch mechanism G F H, to operate in the manner and for the purpose described.

ARCHIBALD H. CROZIER.

Witnesses:
 T. B. MOSHER,
 ALEX. F. ROBERTS.